United States Patent
Boettger et al.

(12)
(10) Patent No.: US 6,625,132 B1
(45) Date of Patent: Sep. 23, 2003

(54) IDLE INTERSYSTEM ROAMING DETERMINATION AND SYSTEM RESELECTION IN A CDMA WIRELESS COMMUNICATION SYSTEM

(75) Inventors: David Boettger, Richardson, TX (US); Kim Chang, Richardson, TX (US)

(73) Assignee: Nortel Networks Ltd, St. Laurent (CA)

( * ) Notice: Subject to any disclaimer, the term of this patent is extended or adjusted under 35 U.S.C. 154(b) by 0 days.

(21) Appl. No.: 09/191,894

(22) Filed: Nov. 13, 1998

Related U.S. Application Data (60) Provisional application No. 60/067,982, filed on Dec. 9, 1997, and provisional application No. 60/065,323, filed on Nov. 13, 1997.

(51) Int. Cl.[7] ............... H04Q 7/00; H04B 7/216
(52) U.S. Cl. ............ 370/329; 370/335; 370/342; 370/332; 455/422; 455/513
(58) Field of Search .............. 370/320, 332, 370/331, 328, 335, 333, 342, 348, 346, 329; 375/130, 287; 455/62, 421, 422, 435, 436, 437, 464, 515, 525, 561, 509, 507, 517

(56) References Cited

U.S. PATENT DOCUMENTS

| | | | |
|---|---|---|---|
| 5,649,000 A | | 7/1997 | Lee et al. |
| 5,828,661 A | * | 10/1998 | Weaver et al. ............... 370/331 |
| 5,859,875 A | * | 1/1999 | Kato et al. .................. 375/267 |
| 5,903,839 A | * | 5/1999 | Mattila ....................... 455/434 |
| 5,930,721 A | * | 7/1999 | Fried et al. ................. 455/466 |
| 5,940,761 A | | 8/1999 | Tiedemann, Jr. et al. |
| 5,978,679 A | | 11/1999 | Agre |
| 5,995,498 A | | 11/1999 | Toot, Jr. et al. |
| 5,999,816 A | | 12/1999 | Tiedmann, Jr. et al. |
| 6,009,328 A | | 12/1999 | Muszynski |
| 6,021,328 A | | 2/2000 | Curtis et al. |
| 6,038,448 A | | 3/2000 | Chheda et al. |
| 6,047,191 A | * | 4/2000 | Desgagne .................. 455/455 |
| 6,212,176 B1 | * | 4/2001 | Andersson et al. ......... 370/347 |

* cited by examiner

*Primary Examiner*—Steven Nguyen
*Assistant Examiner*—Duc Ho
(74) *Attorney, Agent, or Firm*—Bruce Garlick (57) ABSTRACT

A wireless communication system and a mobile station employ at least one threshold to evaluate the quality of transmissions from a serving base station to determine when the mobile station enters a Dead Zone adjacent a border cell of the system. Such thresholds not only consider the ratio of carrier energy (Ec) to interference (Ec/Io) but also consider the energy of the carrier itself. When the relevant measured (or calculated) carrier energy Ec and/or carrier energy to interference ratio Ec/Io are passed, the mobile station performs system reselection, attempting to acquire a different system/carrier. The thresholds employed may be passed from the base station to the mobile station in the System Parameters message, for example.

34 Claims, 6 Drawing Sheets

IDLE INTERSYSTEM ROAMING DETERMINATION AND SYSTEM RESELECTION IN A CDMA WIRELESS COMMUNICATION SYSTEM

CROSS-REFERENCES TO RELATED APPLICATIONS

The present application claims priority pursuant to 35 U.S.C. Sec. 119(e) to U.S. Provisional Application Ser. No. 60/065,323, filed Nov. 13, 1997, pending, and to U.S. Provisional Application Ser. No. 60/067,982, filed Dec. 9, 1997, pending, both of which are hereby incorporated herein by reference in their entirety.

BACKGROUND

1. Technical Field

The present invention relates generally to wireless cellular communication systems; and more particularly to a cellular system in which an idle mobile station determines when it leaves a first cellular system and proceeds into a second cellular system and performs system selection to transition from the first cellular system to the second cellular system.

2. Related Art

Cellular wireless communication systems are generally known to include a plurality of base stations dispersed across a geographic service area. Each of the base stations includes at least one antenna and a base station transceiver system (BTS) and provides wireless service within a respective cell. The BTSs couple to base station controllers (BSCs) with each BSC serving a plurality of BTSs. The BSCs also couple to a mobile switching center (MSC) which interfaces to the Public Switched Telephone Network (PSTN) and other MSCs. Together, the BTSs, BSCs and the MSC form a wireless network which provides wireless coverage to mobile stations (MSs) operating within a respective service area.

Wireless communication systems operate according to various protocol standards. One particular protocol standard in place worldwide is the CDMA protocol standard. CDMA is a direct sequence spread spectrum system in which multiple spread spectrum signals are transmitted and received simultaneously over a common frequency band. In the CDMA system, each mobile station (MS) may be assigned a distinct Walsh code which identifies the signals transmitted to and received from the MS.

In an example of operation thereunder, forward link signals from a BTS to a first MS are spread with a first Walsh code and then transmitted where the process of transmission includes pseudo noise (PN) scrambling (spreading). Likewise, forward link signals transmitted from the BTS to the second MS are spread with the second Walsh code and then transmitted, perhaps concurrently with transmissions from the BTS to the first MS. The first MS's receiver receives at its antenna all of the energy transmitted by the BTS. However, because Walsh code channels are orthogonal, after despreading the received signal with the first Walsh code, the despreader outputs all the energy intended for the first MS but, due to orthogonality loss, none of, or only a small fraction of the energy intended for the second, third, etc., MS. Likewise, the second MS despreads the received forward link signal with the second Walsh code to receive its intended forward link energy. Each of the MSs then operates upon the despread signal energy to extract data intended for the respective MS. The number of users accommodated on the forward link is limited by intra-cell interference due to orthogonality loss, inter-cell interference and other interference such as that due to thermal noise.

Because signals intended for other users of the CDMA system may appear as noise to other users due to orthogonality loss and because transmissions from other cells are not orthogonal to transmissions from a serving cell, CDMA capacity is interference limited. The number of users that can use the same spectrum and still have acceptable performance is determined by the total interference power that all of the users, taken as a whole, generate. Thus, the number of users that may be supported by each BTS on any frequency spectrum is limited.

In the CDMA cells at the border of the CDMA service region and analog AMPS service region, the coverage of the CDMA forward link overhead channels (e.g., Paging Channel, Pilot Signal, etc.) can be very large due to the near absence of out-of-cell interference. A CDMA mobile station in idle mode tends to cling to the Paging Channel as it travels beyond the Reverse Traffic Channel (RTCH) coverage limit of these cells. The area between the RTCH coverage limit and the Paging Channel coverage limit can be thought of as a "Dead Zone". Any attempt at call origination or page response in this area is unsuccessful due a high Frame Error Rate (FER) on the RTCH, yet the mobile station does not attempt to find another serving system due to the (reasonably) high quality of the Paging Channel. Since subscribers in the Dead Zone see on the mobile station display that the CDMA system is available, their perception is poor system performance.

For the CDMA/AMPS dual-mode mobile stations, this problem is a serious concern because, typically, the subscriber expects reliable service even beyond the CDMA coverage area. For the CDMA-only single-mode mobile stations, the subscribers typically do not expect such a large service area but they still expect system access reliability when the mobile station shows that CDMA is available. Note that this problem also arises within the CDMA service region when the first RF carrier is only partially overlaid by a second RF carrier (in a tiered fashion).

Several methods for mitigating this problem exist. For example, the power in the overhead channels can be reduced in order to "convince" the mobile to give up the CDMA system closer to the cell site. In some cases this method is reliable but it does have some limitations. Since a mobile station timer, $T_{30m}$, as defined in the TIA/EIA-95-B CDMA standard allows the mobile station to remain locked to a Paging Channel even if the mobile station receives only one good Paging Channel message in 3 seconds, the required reduction in overhead channel power could be large. This result can be an unacceptable loss in coverage close to the cell site, especially in buildings. Also, even after the mobile station leaves the current serving CDMA system/carrier, the ensuing system search could take a long time (dozens of seconds in some cases).

Controlling overhead channel power by using antenna down-tilt has exhibits performance similar to the above with the following drawbacks. First, there is a practical limit to the amount of mechanical down-tilt which can be applied to an antenna before the coverage pattern becomes too distorted. Second, mechanical down-tilt affects absolute traffic channel coverage as well as overhead channel coverage (though the problem of lost in-building coverage is reduced).

Finally, the Global Service Redirection message can be used to move idle traffic from the border CDMA cell/carrier to another system or carrier. However, this under-utilizes the hardware resources in the border cells and again can result in a long service outage period in which the mobile station tries to acquire the new server.

One possible solution to this problem is to reduce the $T_{30m}$ timer so that the mobile station will give up on the Paging Channel sooner (at a lower Maximum Error Rate [MER]) than it does currently. However, this could result in the mobile station beginning a complete system search after merely passing through a temporary coverage hole or area of high interference. This solution also fails to reduce the new system search time.

Thus, there is a need in the art for a method of operating a CDMA wireless communication system and a mobile station therein in which the mobile station recognizes when it is in the Dead Zone and performs system reselection but does not perform such system reselection when it is not in the Dead Zone.

SUMMARY OF THE INVENTION

Thus, to overcome the shortcomings of the prior systems, among other shortcomings, a wireless communication system and mobile station constructed according to the present invention employ meaningful thresholds to evaluate the quality of the transmissions from a serving base station to determine when the mobile station enters the Dead Zone adjacent a border cell of the system. Such thresholds not only consider the ratio of carrier energy to interference (Ec/Io) but also consider the energy of the carrier (Ec) itself. When the relevant measured (or calculated) carrier energy Ec and/or carrier energy to interference ratio Ec/Io are passed, the mobile station performs system reselection, attempting to acquire a different system/carrier.

The thresholds employed may be passed from the base station to the mobile station in the TIA/EIA-95-B Extended System Parameters Message, for example. Specifically, the parameters EC_IO_THRESH and EC_THRESH are used to indicate the EC/IO threshold and total receive power threshold, respectively, below which the mobile station should perform system re-selection. These parameters may be determined by the system operator using drive test data, by historical operating information by simulating the system or by other means. Alternatively, the system itself may determine the parameters based upon feedback received, such as the quality of reverse link transmissions from mobile stations operating in a respective cell. As is apparent, these thresholds may be similar in magnitude for border cells across the system. However, some variation will likely be encountered due to the operating characteristics of the base station serving the cell, the RF propagation characteristics within the cell and other factors which affect both forward link and reverse link performance.

According to the present invention, additional parameters may also be sent from the system to the mobile station relating to bordering systems and/or overlaying systems. These parameters may be passed in an Extended System Parameters Message, a Neighbor List Message, an Extended Neighbor List Message or a General Neighbor List Message, for example. These additional parameters suggest to the mobile station particular systems/carriers which the mobile station should try to acquire. Such systems/carriers information provide information regarding other CDMA systems and other analog systems, among other types of systems.

Moreover, other aspects of the present invention will become apparent with further reference to the drawings and specification which follow.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE DRAWINGS

Figure 1:
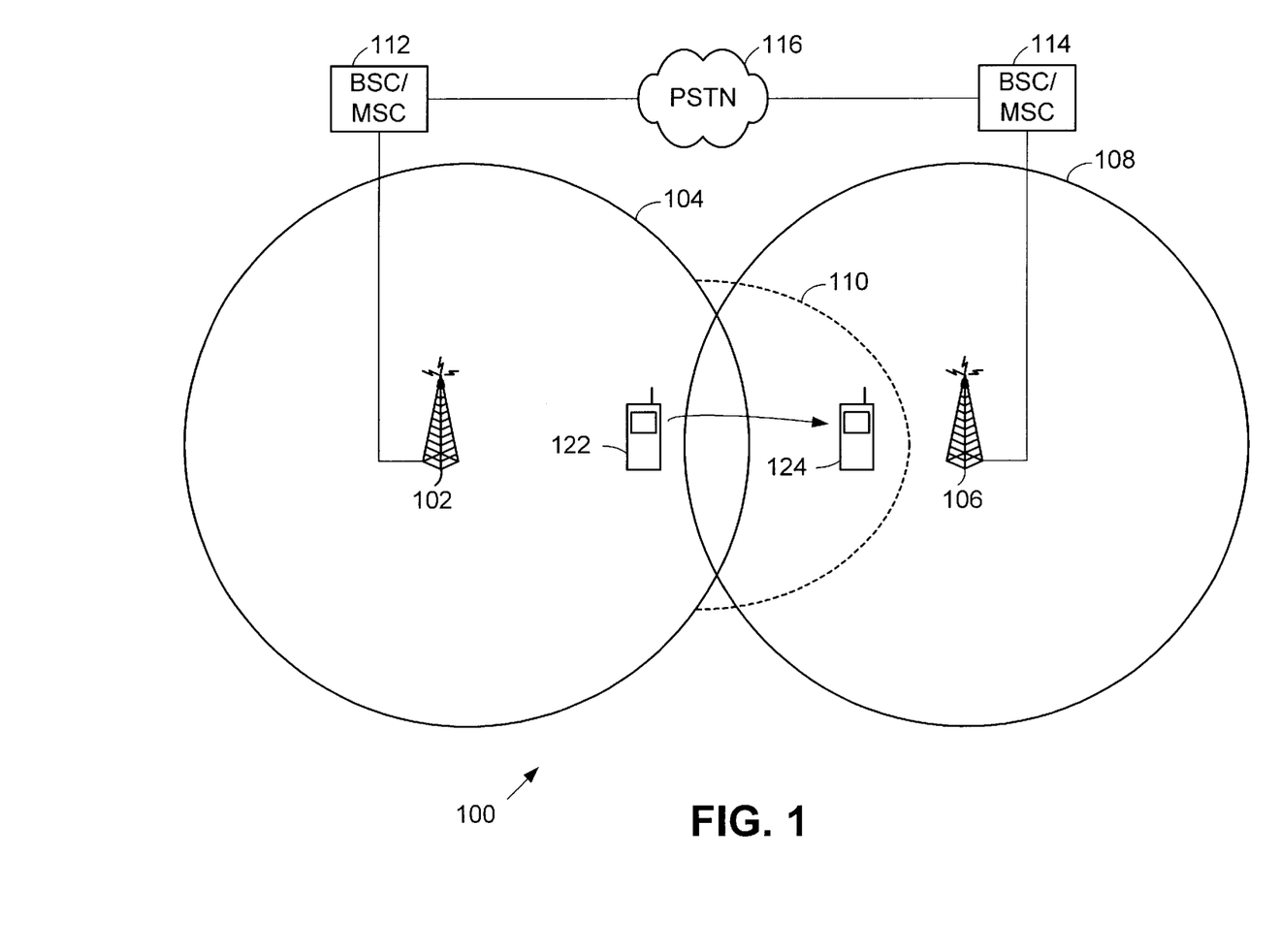
FIG. 1 is a system diagram illustrating a portion of a wireless communication system constructed according to the present invention in which an idle mobile station initiates system reselection when moving from the coverage area of the wireless communication system.

FIG. 1 is a system diagram illustrating a portion of a wireless communication system constructed according to the present invention in which an idle mobile station initiates system reselection when moving from the coverage area of the wireless communication system. The wireless communication system serves a geographic area adjacent a neighboring (or overlaying) wireless communication system. The wireless communication system operates according to a Code Division Multiple Access (CDMA) standard. However, the neighboring wireless communication system may operate according to the CDMA standard on a different carrier frequency or another standard, such as an analog standard.

The portion of the wireless communication system illustrated includes a base station 102 and a supporting infrastructure 112 that include a plurality of Base Station Controllers (BSCs) and at least one Mobile Switching Center (MSC). The construction of such a wireless communication system is generally known. In such construction, a plurality of additional base stations (not shown) each serve a respective cell, each of which may include a plurality of sectors. Each of the base stations couples to a respective BSC with each BSC serving a plurality of base stations. The BSC(s) couple the base stations to the MSC, which performs switching for the wireless communication system. The MSC couples to the Public Switched Telephone Network (PSTN) 116 and route calls between endpoints coupled to the PSTN 116 and mobile stations served by the wireless communication system.

As shown, the base station 102 services wireless communications within its respective cell 104. The cell 104 of the wireless communication system lies adjacent a cell 108 of a neighboring wireless communication system. A base station 106 of the neighboring wireless communication system supports communications within the cell 108 and couples to an infrastructure 114 of the wireless communication system. As with the infrastructure 112 of the wireless communication system, the infrastructure 114 of the neighboring wireless communication system also includes a plurality of BSCs and at least one MSC which couples to the PSTN 116.

To illustrate operation of the wireless communication system, a mobile station is first illustrated to be at position 122 and then to move to position 124. Dead Zone 110 is the area outside of cell 104 in which the mobile station receives the Paging Channel from the base station 102 with satisfactory signal quality according to prior standards but in which the mobile station cannot access the base station 102 on the reverse link via an access channel or a traffic channel.

A typical measure of the quality of forward link transmissions is the ratio Ec/Io (dB) where Ec is the strength of the carrier of the paging channel and Io is the interference signal. Io is primarily caused by forward link transmissions from neighboring cells operating on a same carrier frequency, i.e. other cells of the wireless communication system.

However, when the mobile station moves into the dead zone from position 122 to position 124, Ec/Io degrades only slightly. Such is the case because as the mobile station moves away from the base station 102, Ec decreases. But, as the mobile station moves away from the base station 102, it also is moving away from all other base stations of the wireless communication system, such other base stations providing the primary component of Io. Thus, both Ec and Io decrease and the ratio Ec/Io changes little.

Thus, according to the present invention, additional criteria are employed to determine when the mobile station is entering the dead zone 110. Not only does the mobile station employ threshold. (EC_IO_THRESH) employed to investigate the quality of Ec/Io, the mobile station also employs a threshold (EC_THRESH) to investigate the quality of Ec. When one or more of these thresholds are passed, the mobile station initiates system reselection so that it may become active within the neighboring wireless communication, i.e., register with base station 106 and operate within cell 108.

Further, according to the present invention, base station 102 also broadcasts information regarding neighboring and overlaying systems. Based upon this information, then, the mobile station seeks other wireless communication systems during its system reselection process. In an example of such operation, the mobile station operates according to the CDMA standard within cell 104. However, when it performs system reselection and commences operating within the neighboring wireless communication system, the mobile station operates according to the standard supported by the neighboring wireless communication system. Such standard may also be the CDMA standard, with the neighboring wireless communication system operating on a different carrier frequency. However, the standard may be another standard, such as the Advanced Mobile Phone System (AMPS) analog standard.

In one particular embodiment, the thresholds EC_IO_THRESH and EC_THRESH are transmitted from the base station 102 to the mobile station in the Extended System Parameters Message (in a TIA/EIA-95-B compliant system). The information indicating the other systems/carriers that the mobile station should acquire may also be contained within the Extended System Parameters Message. Alternatively, such information may be included in the a Neighbor List Message, an Extended Neighbor List Message or a General Neighbor List Message.

The parameter SYS_AVAIL (10 bits), a bitfield, contained in the System Parameters message may be employed to indicate the systems/carriers which the mobile station should try to acquire when in a Dead Zone. There is one bit for each PCS block, one each for cellular A and B bands, and one each for AMPS A and B bands. Finally, the RETURN_IF_FAIL bit (also contained in the System Parameters message) allows or disallows the mobile's return to the current serving system.

The mobile station would use these parameters as follows. In a cell in which these parameters are transmitted, when either the EC_IO_THRESH threshold or the RSSI_THRESH threshold is crossed (or both), the mobile station would try to acquire the systems/carriers in the SYS_AVAIL list according to the mobile station's capabilities, the preferred roaming list, the subscriber's preferences, etc. Note that multiple bits in SYS_AVAIL may be set simultaneously. Also note that, if the SYS_AVAIL list indicates a system to which the mobile station is already locked, this indicates that a different carrier in the same system is available.

Figure 2:
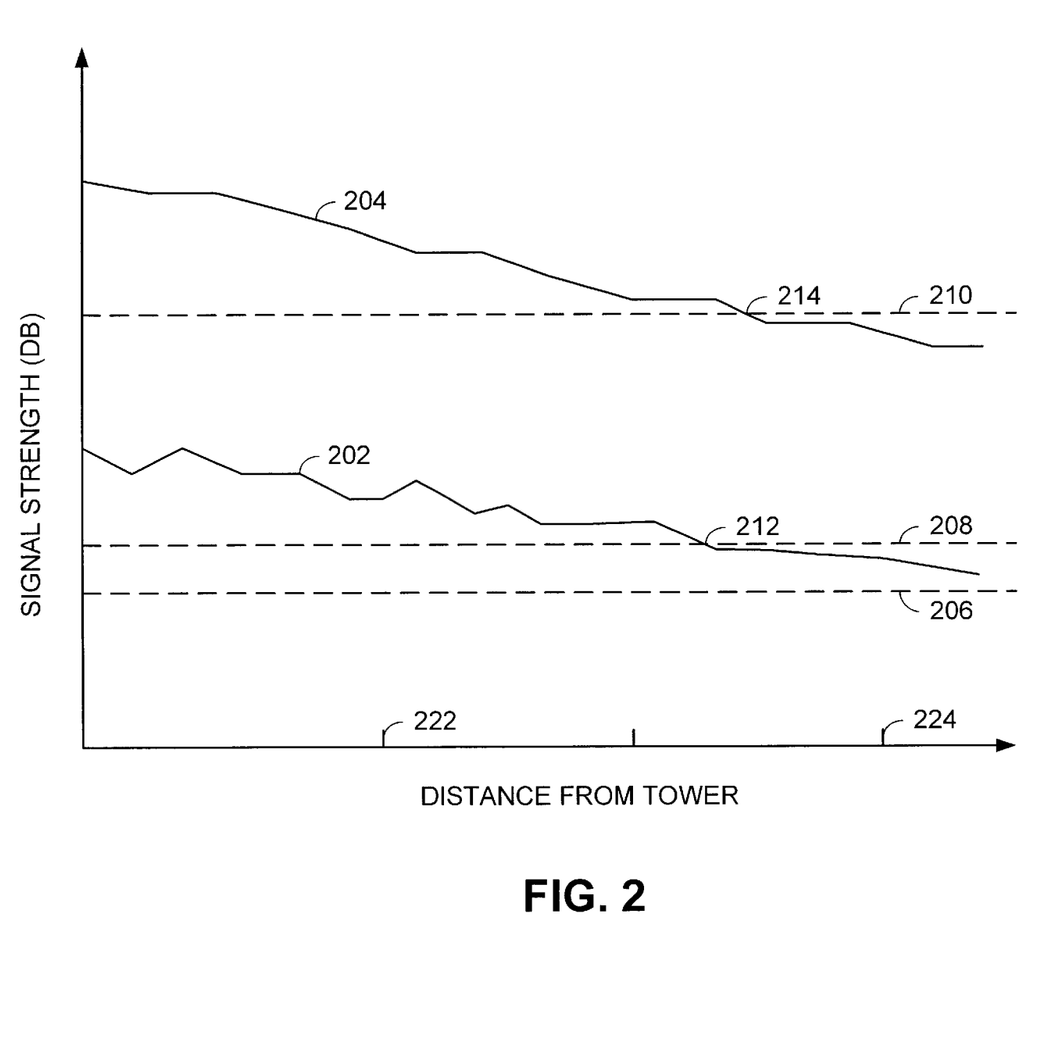
FIG. 2 is a chart illustrating the manner in which the mobile station determines when it is leaving a cell of the wireless communication system of FIG. 1.

FIG. 2 is a chart illustrating the manner in which the mobile station determines when it should initiate system reselection when it is leaving a cell of the wireless communication system of FIG. 1. In the chart, curve 202 represents the carrier energy to interference measurement in Decibels [$-20*\log_{10}$ (Ec/Io)], where Ec/Io is the ratio of the measured power of the pilot signal to the interference of the cell from which the mobile station left and from which it still receives a forward link signal (e.g., pilot signal, paging channel signal, etc.). Further, curve 204 represents the measured power of the pilot signal (pilot_power) of the cell it is leaving. One manner of calculating such power of the pilot signal is: pilot_power (dBm/1.23 MHz)=$-20*\log_{10}$ (Ec/Io) (dB)+mean input power (dBm/1.23 Mhz).

Threshold EC_IO_SYS 206 is employed in determining when to inititiate a search for the pilot signal of another base station of the same wireless communication system. When an idle mobile station roams from a first cell to a second cell of a serving wireless communication system, the carrier energy to interference measurement of curve 202 would decrease at a relatively rapid rate to a level below the EC/IO_SYS 206 curve. In such case, the mobile station would seek another base station in the same system (having the same carrier frequency). However, the example illustrated in FIG. 2 corresponds to operation wherein the mobile station enters a Dead Zone on the boudary of the wireless communication system. Thus, the EC_IO_SYS 206 threshold is never met or passed.

According to the present invention, thresholds EC_THRESH 210 and EC_IO_THRESH 208 are provided to the mobile station from the then serving base station on the forward link (Extended System Parameters Message). According to the present invention, the mobile station performs system reselection (e.g., enters a System Determination Substate of the Mobile Station Initialization State) when the following are true:

(1) $-20*\log_{10}$ (Ec/Io)<EC_IO_THRESH; and (2) pilot_power<EC_THRESH$_s$.

In another embodiment of the present invention, only criteria number (2) must be satisfied to initiate system reselection. However, when using only the single criteria, the possibility of initiating a system reselection in error increases. Nonetheless, such criteria would cause the mobile station to initiate system reselection when such would likely be required.

In still another embodiment of the present invention, an additional parameter, RESELECT_INCLUDED, may be set in the mobile station by the user, the wireless communication or the mobile station parameter that limits the ability of the mobile station to initiate system reselection based on the thresholds. In such case, if the parameter RESELECT_INCLUDED were set to "1", the mobile station would initiate system reselection if the two thresholds were satisfied.

Figure 3:
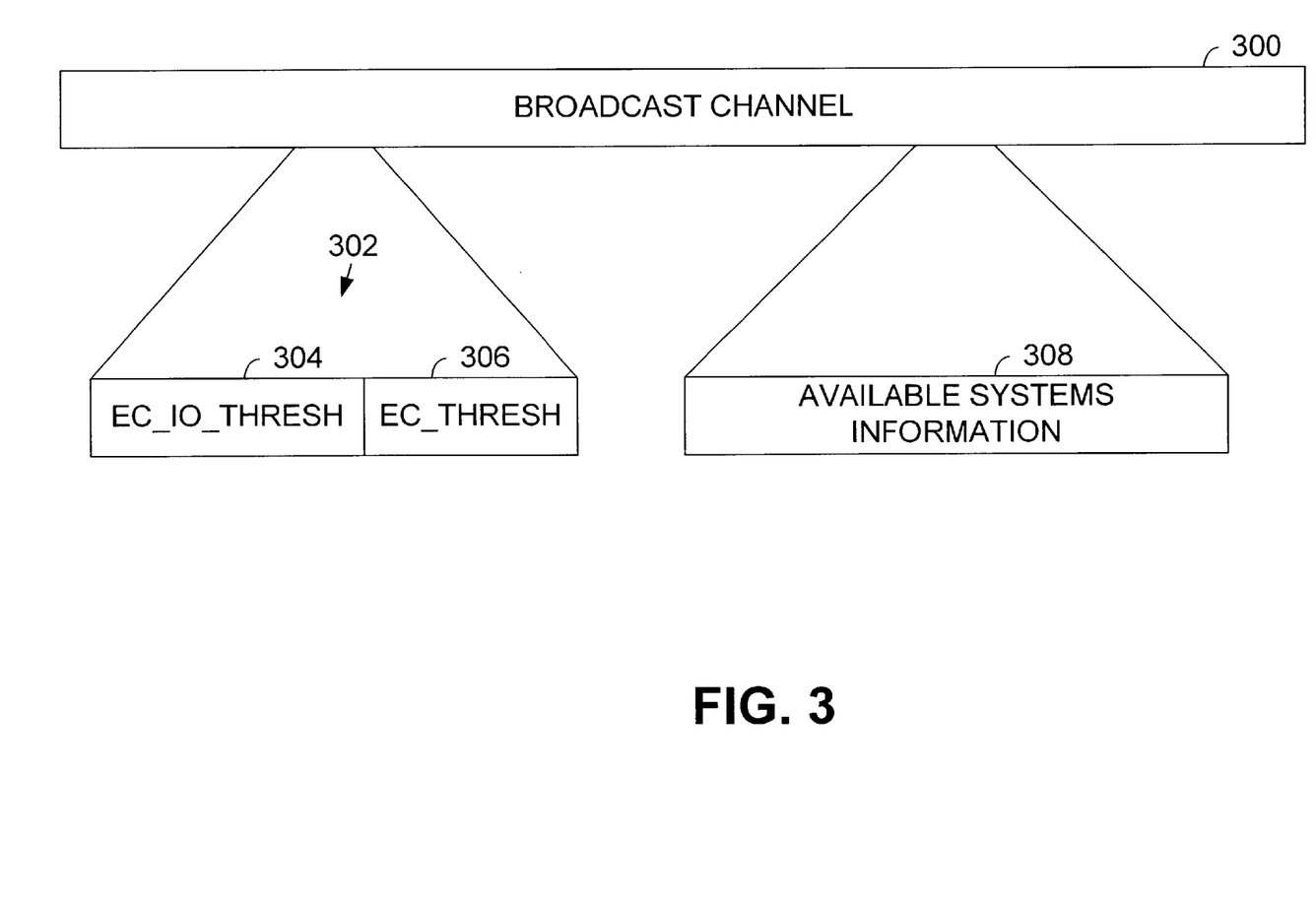
FIG. 3 is a block diagram illustrating the structure of a broadcast channel with particular reference to parameters passed to mobile stations that are employed to determine when the mobile station is leaving the wireless communication system and information apprising the mobile station of the existence of neighboring and overlaying systems.

FIG. 3 is a block diagram illustrating the structure of a broadcast channel with particular reference to parameters passed to mobile stations that are employed to determine when the mobile station is leaving the wireless communication system and information apprising the mobile station of the existence of neighboring and overlaying systems. As is shown, thresholds 302 passed to the mobile station include EC_IO_THRESH 304 and EC_THRESH 306. Further, the available systems information 308 is broadcast to the mobile station on the broadcast channel 300.

In a first embodiment of the present invention, the thresholds EC_IO_THRESH 304 and EC_THRESH 306 as well as the available systems information 308 is contained in an Extended System Parameters message. In such case, the parameter RESELECT_INCLUDED is also included in the Extended System Parameters message. The thresholds EC_IO_THRESH 304 and/or EC_THRESH 306 both have a length of 5 bits. Further, the parameter SYS_AVAIL is included in the Extended System Parameters message, has a length of 16 bits, and indicates what other systems are available, if any. An example of such parameter SYS_AVAIL is illustrated in TABLE 1 as:

TABLE 1

Available System Information

| Subfield | Length (bits) | Subfield Description |
| --- | --- | --- |
| AMPS_A | 1 | AMPS, System A |
| AMPS_B | 1 | AMPS, System B |
| CDMA_0_A | 1 | CDMA, Band Class 0, System A |
| CDMA_0_B | 1 | CDMA, Band Class 0, System B |
| CDMA_1_A | 1 | CDMA, Band Class 1, A block |
| CDMA_1_B | 1 | CDMA, Band Class 1, B block |
| CDMA_1_C | 1 | CDMA, Band Class 1, C block |
| CDMA_1_D | 1 | CDMA, Band Class 1, D block |
| CDMA_1_E | 1 | CDMA, Band Class 1, E block |
| CDMA_1_F | 1 | CDMA, Band Class 1, F block |
| RESERVED | 6 | |

The serving base station sets each subfield to '1' if the corresponding system is available for system reselection; otherwise, the base station sets the subfield to '0'. As is illustrated, the set of available subfields assumes that the mobile station supports both CDMA operation and AMPS operation.

In a second embodiment of the available systems information 308, the thresholds EC_IO_THRESH 304 and EC_THRESH 306 are contained in an Extended System Parameters message. However, the available systems information 308 is contained in a General Neighbor List message which is also transmitted on the broadcast channel. An example of such a General Neighbor List message is illustrated in TABLE 2 as:

TABLE 2

General Neighbor List Message

| Field | Length (bits) |
| --- | --- |
| MSG_TYPE ('00010110') | 8 |
| PILOT_PN | 9 |
| CONFIG_MSG_SEQ | 6 |
| PILOT_INC | 4 |
| NGHBR_SRCH_MODE | 3 |
| NUM_NGHBR | 5 |
| NUN_NGHBR occurrences of the following record: | |
| NGHBR_CONFIG | 3 |
| NGHBR_PN | 9 |
| SEARCH_PRIORITY | 0 or 2 |
| SRCH_WIN_NGHBR | 0 or 4 |
| FREQ_INCL | 1 |
| NGHBR_BAND | 0 or 5 |
| NGHBR_FREQ | 0 or 11 |
| NUM_ANALOG_NGHBR | 3 |
| NUM_ANALOG_NGHBR occurrences of the following record: | |
| BAND_CLASS | 5 |
| SYS_A_B | 2 |
| RESERVED | 0–7 (as needed) |

In the General Neighbor List Message, the parameter NUM_ANALOG_NGHBR indicates the number of neighboring analog systems. The base station sets this field to the number of neighboring analog systems included in the message. The base station shall include one occurrence of the record BAND_CLASS and one occurrence of the record SYS_A_B for each neighboring base station included in the message. The base station sets the BAND_CLASS parameter to the to the CDMA band class, as specified in TSB58. The base station also sets the SYS_A_B parameter. If BAND_CLASS is set to '00000', the base station shall set the SYS_A_B parameter to the value shown in Table 3 corresponding to the availability of neighboring analog systems; otherwise, the base station shall set this field to '00'.

TABLE 3

Cellular System A/B

| Cellular System A/B | Value |
| --- | --- |
| RESERVED | 00 |
| System A | 01 |
| System B | 10 |
| System A and B | 11 |

Figure 4:
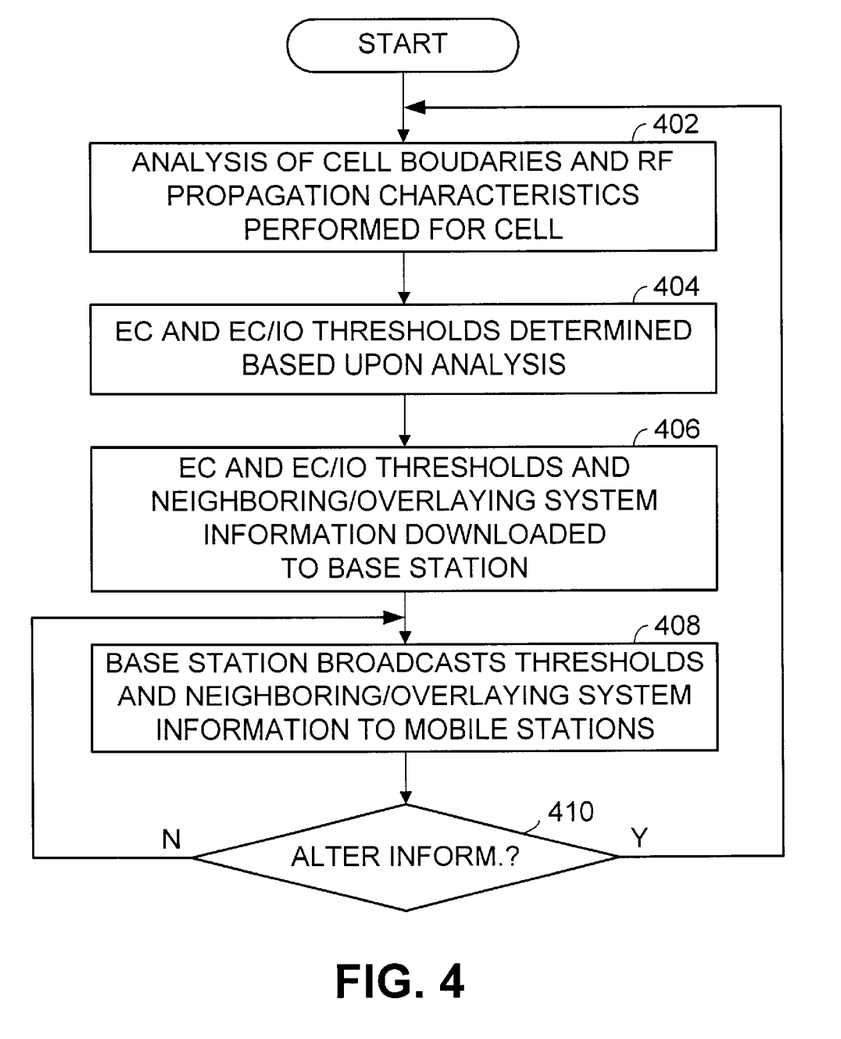
FIG. 4 is a logic diagram illustrating operation of the wireless communication system in determining parameters according to the present invention for a particular base station and in broadcasting the parameters to mobile stations operating in the wireless communication system.

FIG. 4 is a logic diagram illustrating operation of the wireless communication system in determining parameters according to the present invention for a particular base station and in broadcasting the parameters to mobile stations operating in the wireless communication system. Operation commences at step 402 wherein an analysis of cell boundaries and RF propagation characteristics are performed for the cell. In such analysis, the limits of the forward link as well as the relevant reverse link transmission capabilities of the mobile stations are investigated. Such investigation may be performed based upon drive test data, simulation data or based upon actual mobile station performance within the cell under consideration.

While the forward link characteristics are typically consistent across all mobile stations, some mobile stations have stronger transmitters than others and thus are able to cause reverse link transmissions to reach the base station at an acceptable power level from a relatively farther distance from the base station. Such varying capabilities are considered at step 404 where the thresholds EC_THRESH and EC_IO_THRESH are determined for the cell based upon the analysis at step 402. In a first embodiment of the present invention, the thresholds EC_THRESH and EC_IO_THRESH are the same for all mobile stations operating within the cell serviced by the base station and for all border cells across the system.

However, in another embodiment, two or more sets of thresholds are determined, each of which is employed by a particular class of mobile stations. Since mobile stations with a greater reverse link transmit power can operate farther from a base station than mobile stations with lesser reverse link transmit power, the mobile stations having greater transmit power may cling to the servicing base station longer. In such case, the thresholds that these mobile stations employ would be less than those employed by mobile stations having lesser reverse link transmit power. In still another alternate embodiment, the mobile stations receiving the thresholds would adjust the thresholds they employ based upon their relative transmitter strengths. In this fashion, mobile stations with greater transmitter strengths my operate farther from the base station without initiating system reselection.

From step 404, operation proceeds to step 406 where the thresholds are downloaded to the base station for subsequent transmission to the mobile stations operating in the respective cell. At the same time, information regarding available systems (and respective adjacent cells) may also be downloaded to the base station. Then, at step 408, the base station broadcasts the thresholds EC_THRESH and EC_IO_THRESH in a System Parameters message or such other message as may be used. Further, at step 408, the base station broadcasts the available systems information to the mobile stations operating within the respective cell. Such available systems information may be included in the Extended System Parameters Message or may be included in another message such as the Neighbor List Message, the Extended Neighbor List Message or the General Neighbor List Message.

Operation then proceeds to step 410 wherein a base station broadcasting the information determines if the relevant broadcasting information should be altered. If so, operation proceeds to step 402 wherein at least some of steps 402, 404 and 406 are repeated to provide the base station with updated thresholds (and other system information when appropriate). Such operation may occur after a certain operating condition is met such as a high Frame Error Rate (FER) of reverse link signals received from mobile stations, another operating criteria or after a time period has expired.

Figure 5:
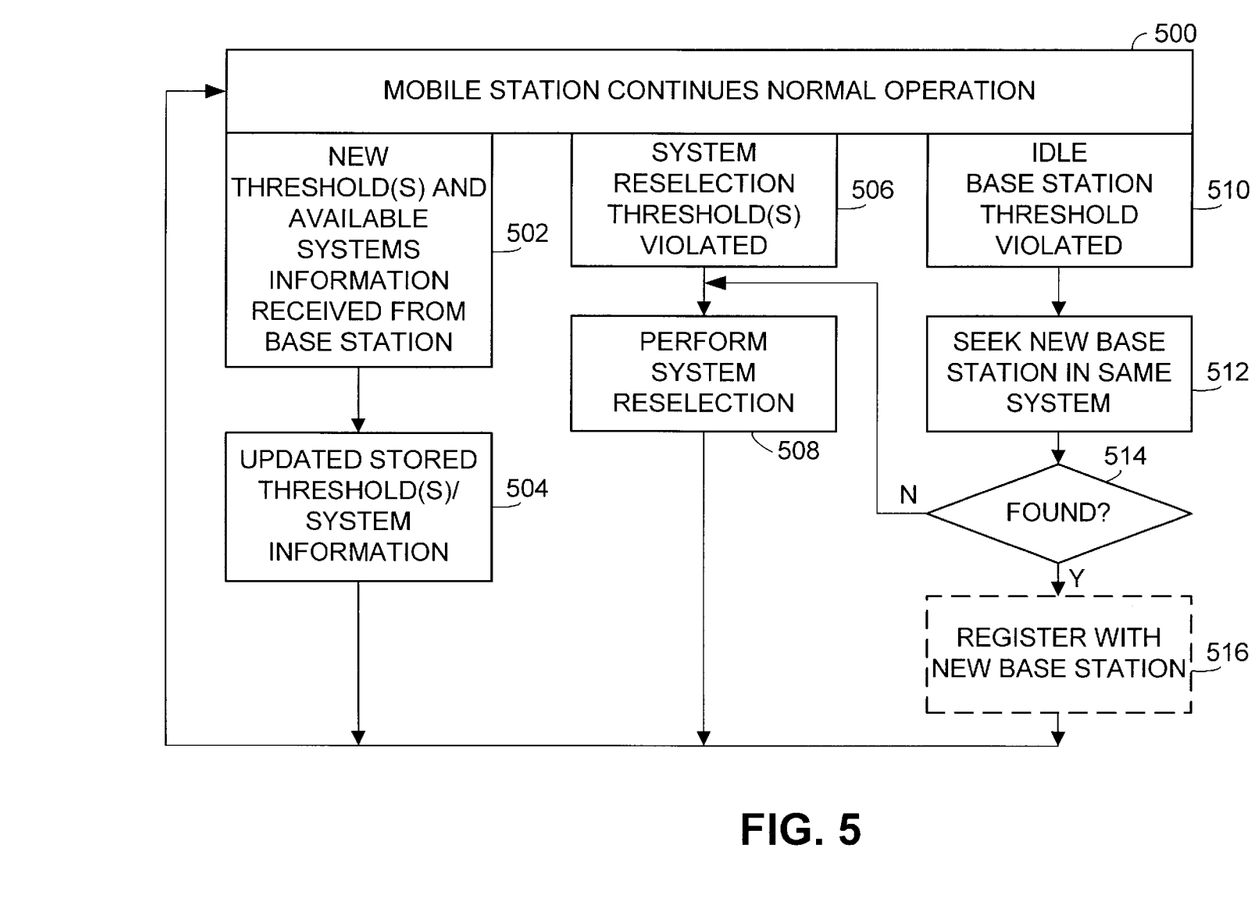
FIG. 5 is a logic diagram illustrating operation of a mobile station according to the present invention in receiving threshold parameters from a base station, in seeking a new base station when operating conditions require and in performing system selection when operating conditions require.

FIG. 5 is a logic diagram illustrating operation of a mobile station according to the present invention in receiving threshold parameters from a base station, in seeking a new base station when operating conditions require and in performing system selection when operating conditions require. Operation commerce/continues at step 500 wherein the mobile station continues in its normal operations 500. Because the present invention has particular relevance to operation of a mobile station while idle, step 500 could correspond to operation in an idle state wherein the mobile station listens to the pilot signal, the paging channel or another forward link signal of a servicing base station. Thus, from step 500, operation may proceed to step 502 where new thresholds (and available systems information) are received from the base station. Upon receipt, the mobile station stores these new thresholds (and available systems information) for subsequent use. Steps 502 and 504 are each initiated at power-up of the mobile station so that these parameters are available for use.

At step 506, the mobile station has determined that the system reselection threshold(s) have been violated. As was previously described, two thresholds, EC_THRESH and EC_IO_THRESH may both be employed to determine when the mobile station is in the Dead Zone. However, EC_THRESH may be used by itself in some embodiments to determine when the mobile station is in the Dead Zone. In either case, from step 506 operation proceeds to step 508 wherein system reselection is performed. In performing system reselection, the mobile station may use the available systems information in searching for other wireless communication system broadcast signals, pilot signals or other forward link signals acting as beacons for the base stations of the wireless communication system.

In still another operation, to contrast the operation according to the present invention, the mobile station determines that an idle base station threshold EC_IO_SYS has been violated at step 510. Such a threshold EC_IO_SYS was illustrated at numeral 206 of FIG. 2 and differs from the threshold EC_IO_THRESH. When the mobile station roams from a serving base station toward a neighboring base station of the same wireless communication system, the pilot signal of the neighboring base station produces greater noise (Io) as seen by the mobile station while the energy from the carrier of the serving base station (Ec) decreases. Thus, the ratio Ec/Io decreases and the idle base station is exceeded.

The mobile station then seeks a new base station in the same system at step 512. If the mobile station cannot find a new base station in the same system, as determined at step 514, operation proceeds to step 508 where the mobile station performs system reselection. However, if a new base station is found, as determined at step 514, operation proceeds to optional step 516 where the mobile station may register with the new base station. Alternatively, the mobile station simply camps on the broadcast signal of the new base station, receives new parameters and continues to listen, without registering with the new base station. If the mobile station cannot find a new carrier/system, it may return to the prior carrier/system. From steps 504, 508 and 516 operation proceeds to step 500.

Figure 6A:
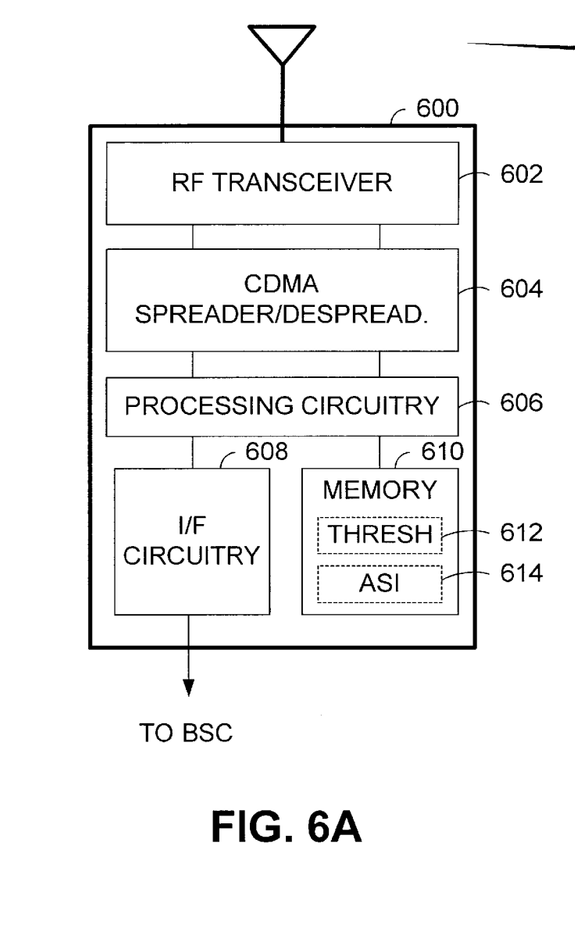
FIG. 6A is a block diagram illustrating construction of a base station that operates according to the present invention.

FIG. 6A is a block diagram illustrating construction of a base station 600 that operates according to the present invention. The base station includes a base station transceiving subsystem (BTS) 600 and an antenna 601 coupled thereto. The BTS 600 includes a radio frequency (RF) transceiver 602 coupled to the antenna 601, a CDMA spreader/despreader 604, processing circuitry 606, interface circuitry 608 and memory 610 (these components are coupled as illustrated or in another similar fashion). Stored in memory are the thresholds 612 and available systems information 614 previously discussed with regard to the present invention.

The components of the BTS 600 support the transmission of the thresholds 612 and the available systems information 614 to mobile stations operating in a serviced cell. The thresholds 612 may be determined by the BTS 600 based upon information collected during its operation or based upon information received from a BSC that couples to the BTS via the interface circuitry 608. Alternately, the thresholds 612 may be received directly the BSC via the interface circuitry 608. The available systems information 614 is typically received from the BSC.

Figure 6B:
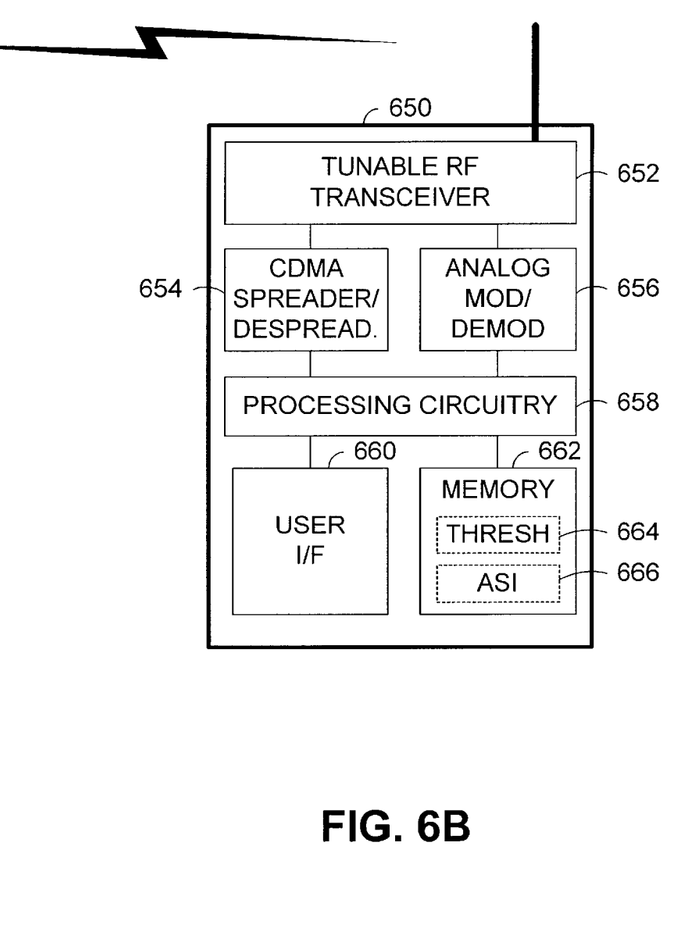
FIG. 6B is a block diagram illustrating construction of a mobile station that operates according to the present invention.

FIG. 6B is a block diagram illustrating construction of a mobile station 650 that operates according to the present invention. The mobile station includes an antenna 651 coupled, tunable a radio frequency (RF) transceiver 652 coupled to the antenna 651, a CDMA spreader/despreader 654, an analog modulator/demodulator 656, processing circuitry 658, a user interface 660 and memory 662 (these components are coupled as illustrated or in another similar fashion). Stored in memory are the thresholds 664 and available systems information 666 previously discussed with regard to the present invention.

The components of the BTS 650 support the receipt of the thresholds 664 and the available systems information 666 from the base station servicing the cell in which the mobile station operates. The tunable RF transceiver 652, CDMA spreader/despreader 654 and the processing circuitry 658 work in concert to determine when the mobile station is in the Dead Zone according to the techniques previously described using the thresholds 664 stored in memory 662. Further, once such a determination is made, the processing circuitry 658, working in concert with the tunable RF transceiver 652, the CDMA spreader/despreader 654 and/or the analog demodulation circuitry 656 performs system reselectioh. In performing the system reselection, the mobile station employs the available systems information 666.

As will be understood, the tunable RF transceiver 652 allows the mobile station to tune to carriers at differing frequencies. The tunable RF transceiver 652 may be a single frequency nimble unit or may be a plurality of RF units, each of which operates at one or more RF frequencies. Further, by having both the CDMA spreader/despreader circuitry 654 and the analog modulator/demodulator circuitry 656, the mobile station may operate in both CDMA and analog systems, e.g., AMPS. Thus, upon system reselection, based upon the available systems information 666, the mobile station may seek other CDMA systems and/or analog systems.

The following changes to the TIA/EIA-95-B standard according to the present invention are as follows, with additions being underlined.

Proposed TIA/EIA-95-B Text Changes
1.1.2.2 CDMA Numeric Information

The following are internal values stored by the mobile station in temporary memory which are not sent over the air. See Annex F for values stored by the mobile station in permanent and semi-permanent memory.

[ . . . ]

ANALOG_NGHBR_LIST—List containing neighboring analog systems information.

[ . . . ]

EC_IO_THRESH$_s$—Pilot $E_c/I_0$ threshold used for system reselection.

EC_THRESH$_s$—Pilot power threshold used for system reselection.

[ . . . ]

NUM_ANALOG_NGHBR$_s$—Number of neighboring analog systems.

[ . . . ]

RESELECT_INCLUDED$_s$—System reselection information included indicator. When this field is set to '1', the system reselection procedure is enabled.

[ . . . ]

6.6.1.1 System Determination Substate

In this substate, the mobile station selects the system to use.

Upon entering the System Determination Substate, the mobile station shall initialize registration parameters as specified in 6.6.5.5.1.1.

If the mobile station enters the System Determination Substate with a power-up indication, the mobile station shall set RAND$_s$ to 0 (see 2.3.12.1.2), PACAs to disabled, NDSS ORIG$_s$ to disabled, MAX REDIRECT DELAY$_s$ to 31, and REDIRECTION$_s$ to disabled. If the mobile station supports analog mode operation in Band Class 0, the mobile station shall set the First-Idle ID status to enabled (see 2.6.3.11). The mobile station shall select a system in accordance with the custom system selection process (see 6.6.1.1.1), and shall attempt to acquire the selected system (see 6.6.1.1.4).

[ . . . ]

If the mobile station enters the System Determination Substate with an acquisition failure indication, the mobile station shall perform the following:

If REDIRECTION$_s$ is equal to enabled, the mobile station shall attempt to select another system in accordance with the current redirection criteria (see 6.6.1.1.2). If the mobile station is able to select another system, the mobile station shall attempt to acquire the selected system (see 6.6.1.1.4). Otherwise, if the mobile station has exhausted all possible selections using the current redirection criteria, the mobile station shall perform the following:

The mobile station shall set REDIRECTION$_s$ to disabled.

The mobile station shall set RETURN_CAUSE$_s$ to '0001'.

If RETURN_IF_FAIL$_s$ is equal to '1', the mobile station shall attempt to select the system from which it was redirected, and shall attempt to acquire the selected system (see 6.6.1.1.4). The precise process for determining how to select the system from which the mobile station was redirected is left to the mobile station manufacturer.

If RETURN_IF_FAIL$_s$ is equal to '0', the mobile station shall select a system other than the system from which it was redirected in accordance with the custom system selection process (see 6.6.1.1.1), and shall attempt to acquire the selected system (see 6.6.1.1.4). The precise process that the mobile station uses to avoid selecting the system from which it was redirected is left to the mobile station manufacturer.

If REDIRECTION$_s$ is equal to disabled, the mobile station shall select a system in accordance with the custom system selection process (see 6.6.1.1.1), and shall attempt to acquire the selected system (see 6.6.1.1.4).

If the mobile station enters the System Determination Substate with a new system indication, the mobile station shall set REDIRECTIONS to disabled. If NDSS ORIG$_s$ is enabled, the mobile station shall set NDSS ORIG$_s$ to disabled and should indicate to the user that the call origination has been canceled. The mobile station shall select a system in accordance with the custom system selection process (see 6.6.1.1.1), and shall attempt to acquire the selected system (see 6.6.1.1.4).

If the mobile station enters the System Determination Substate with a CDMA available indication, the mobile station shall set REDIRECTION$_s$ to disabled. If NDSS ORIG$_s$ is enabled, the mobile station shall set NDSS ORIG$_s$ to disabled and shall indicate to the user that the call origination is canceled. The mobile station should set CDMACHs to the CDMA Channel (CDMA_FREQ) specified in the CDMA Capability Global Action Message and should attempt to acquire a CDMA system on the specified CDMA channel (see 6.6.1.1.4). If the mobile station does not attempt to acquire a CDMA system on the specified CDMA Channel, the mobile station shall select a system in accordance with the custom system selection process (see 6.6.1.1.1), and shall attempt to acquire the selected system (see 6.6.1.1.4).

If the mobile station enters the System Determination Substate with a reselection indication, the mobile station shall set $REDIRECTION_s$ to disabled. If $NDSS\ ORIG_s$ is enabled, the mobile station shall set $NDSS\ ORIG_s$ to disabled and should indicate to the user that the call origination is canceled. The mobile station shall select a system in accordance with the custom system selection process (see 6.6.1.1.1), and shall attempt to acquire the selected system (see 6.6.1.1.4).

If the mobile station enters the System Determination Substate with a system reselection indication, the mobile station shall set $REDIRECTION_s$ to disabled. If $NDSS\ ORIG_s$ is enabled, the mobile station shall set $NDSS\ ORIG_s$ to disabled and should indicate to the user that the call origination is canceled. The mobile station should attempt to select a system available for system reselection as specified in 6.6.1.1.3, and should attempt to acquire the selected system (see 6.6.1.1.4). The precise process for determining how to select such a system is left to the mobile station manufacturer. If the mobile station does not attempt to select such a system, the mobile station shall select a system in accordance with the custom system selection process (see 6.6.1.1.1), and shall attempt to acquire the selected system (see 6.6.1.1.4).

If the mobile station enters the System Determination Substate with a system indication, the mobile station shall set $REDIRECTION_s$ to disabled. If $NDSS\ ORIG_s$ is enabled, the mobile station shall set $NDSS\ ORIG_s$ to disabled and shall indicate to the user that the call origination is canceled. The mobile station shall select a system in accordance with the custom system selection process (see 6.6.1.1.1), and shall attempt to acquire the selected system (see 6.6.1.1.4).

If the mobile station enters the System Determination Substate with a protocol mismatch indication, the mobile station shall perform the following:

If $REDIRECTION_s$ is equal to enabled, the mobile station shall attempt to select another system in accordance with the current redirection criteria (see 6.6.1.1.2). If the mobile station is able to select another system, the mobile station shall attempt to acquire the selected system (see 6.6.1.1.4). Otherwise, if the mobile station has exhausted all possible selections using the current redirection criteria, the mobile station shall perform the following:

The mobile station shall set $REDIRECTION_s$ to disabled.

The mobile station shall set $RETURN\ CAUSE_s$ to '0010'.

If $RETURN\_IF\_FAIL_s$ is equal to '1', the mobile station shall attempt to select the system from which it was redirected, and shall attempt to acquire the selected system (see 6.6.1.1.4). The precise process for determining how to select the system from which the mobile station was redirected is left to the mobile station manufacturer.

If $RETURN\_IF\_FAIL_s$ is equal to '0', the mobile station shall select a system other than the system from which it was redirected in accordance with the custom system selection process (see 6.6.1.1.1), and shall attempt to acquire the selected system (see 6.6.1.1.4). The precise process for determining how to avoid the system from which the mobile station was redirected is left to the mobile station manufacturer.

If $REDIRECTION_s$ is equal to disabled, the mobile station shall select a system in accordance with the custom system selection process (see 6.6.1.1.1), and shall attempt to acquire the selected system (see 6.6.1.1.4).

If the mobile station enters the System Determination Substate with a system lost indication, the mobile station shall set $REDIRECTION_s$ to disabled. If $NDSS\ ORIG_s$ is enabled, the mobile station shall set $NDSS\ ORIG_s$ to disabled and shall indicate to the user that the call origination is canceled. The mobile station should attempt to select the same system that was lost, and should attempt to acquire the selected system (see 6.6.1.1.4). The precise process for determining how to select the same system is left to the mobile station manufacturer. If the mobile station does not attempt to select the same system, the mobile station shall select a system in accordance with the custom system selection process (see 6.6.1.1.1), and shall attempt to acquire the selected system (see 6.6.1.1.4).

If the mobile station enters the System Determination Substate with a lock indication, the mobile station shall set $REDIRECTION_s$ to disabled. If $NDSS\ ORIG_s$ is enabled, the mobile station shall set $NDSS\ ORIG_s$ to disabled and shall indicate to the user that the call origination is canceled. The mobile station shall select a system in accordance with the custom system selection process (see 6.6.1.1.1), and shall attempt to acquire the selected system (see 6.6.1.1.4).

If the mobile station enters the System Determination Substate with an unlock indication, the mobile station shall set $REDIRECTION_s$ to disabled. If $NDSS\ ORIG_s$ is enabled, the mobile station shall set $NDSS\ ORIG_s$ to disabled and shall indicate to the user that the call origination is canceled. The mobile station shall select a system in accordance with the custom system selection process (see 6.6.1.1.1), and shall attempt to acquire the selected system (see 6.6.1.1.4).

If the mobile station enters the System Determination Substate with an access denied indication, the mobile station shall set $REDIRECTION_s$ to disabled. If $NDSS\ ORIG_s$ is enabled, the mobile station shall set $NDSS\ ORIG_s$ to disabled and shall indicate to the user that the call origination is canceled. The mobile station shall select a system in accordance with the custom system selection process (see 6.6.1.1.1), and shall attempt to acquire the selected system (see 6.6.1.1.4).

If the mobile station enters the System Determination Substate with an NDSS off indication, the mobile station shall set $REDIRECTION_s$ to disabled. If $NDSS\ ORIG_s$ is enabled, the mobile station shall set $NDSS\ ORIG_s$ to disabled and shall indicate to the user that the call origination is canceled. The mobile station shall select a system in accordance with the custom system selection process (see 6.6.1.1.1), and shall attempt to acquire the selected system (see 6.6.1.1.4).

If the mobile station enters the System Determination Substate with a release indication and $REDIRECTION_s$ is equal to enabled, the mobile station shall attempt to select the same system on which the release occurred, and shall attempt to acquire the selected system (see 6.6.1.1.4). The precise process for determining how to select the same system is left to the mobile station manufacturer. If $REDIRECTION_s$ is equal to disabled, the mobile station shall select a system in accordance with the custom system selection process (see 6.6.1.1.1), and shall attempt to acquire the selected system (see 6.6.1.1.4). If NDSS_ORIG$_s$ is enabled, the mobile station shall set NDSS_ORIG$_s$ to disabled.

If the mobile station enters the System Determination Substate with an error indication, the mobile station shall set REDIRECTION$_s$ to disabled. If NDSS_ORIG$_s$ is enabled, the mobile station shall set NDSS_ORIG$_s$ to disabled and shall indicate to the user that the call origination is canceled. The mobile station shall select a system in accordance with the custom system selection process (see 6.6.1.1.1), and shall attempt to acquire the selected system (see 6.6.1.1.4).

If the mobile station enters the System Determination Substate with a redirection indication, the mobile station shall set REDIRECTION$_s$ to enabled. The mobile station shall delete all entries from the ZONE_LIST$_s$ and SID_NID_LIST$_s$. The mobile station shall select a system in accordance with the current redirection criteria (see 6.6.1.1.2), and shall attempt to acquire the selected system (see 6.6.1.1.4). If the mobile station enters the System Determination Substate with a registration rejected indication, the mobile station shall perform the following:

If REDIRECTION$_s$ is equal to enabled, the mobile station shall perform the following:

The mobile station shall set REDIRECTION$_s$ to disabled.

The mobile station shall set RETURN_CAUSE$_s$ to '0011'.

If RETURN_IF_FAIL$_s$ is equal to '1', the mobile station shall attempt to select the system from which it was redirected, and shall attempt to acquire the selected system (see 6.6.1.1.4). The precise process for determining how to select the system from which the mobile station was redirected is left to the mobile station manufacturer.

If RETURN_IF_FAIL$_s$ is equal to '0', the mobile station shall select a system other than the system from which it was redirected in accordance with the custom system selection process (see 6.6.1.1.1), and shall attempt to acquire the selected system (see 6.6.1.1.4). The precise process for determining how to avoid the system from which the mobile station was redirected is left to the mobile station manufacturer.

If REDIRECTION$_s$ is equal to disabled, the mobile station shall select a system in accordance with the custom system selection process (see 6.6.1.1.1), and shall attempt to acquire the selected system (see 6.6.1.1.4).

If the mobile station enters the System Determination Substate with a wrong system indication, the mobile station shall perform the following:

If REDIRECTION$_s$ is equal to enabled, the mobile station shall attempt to select another system in accordance with the current redirection criteria (see 6.6.6.1.1.2). If the mobile station is able to select another system, the mobile station shall attempt to acquire the selected system (see 6.6.1.1.4). Otherwise, if the mobile station has exhausted all possible selections using the current redirection criteria, the mobile station shall perform the following:

The mobile station shall set REDIRECTION$_s$ to disabled.

The mobile station shall set RETURN_CAUSE$_s$ to '0100'.

If RETURN_IF_FAIL$_s$ is equal to '1', the mobile station shall attempt to select the system from which it was redirected, and shall attempt to acquire the selected system (see 6.6.1.1.4). The precise process for determining how to select the system from which the mobile station was redirected is left to the mobile station manufacturer.

If RETURN_IF_FAIL$_s$ is equal to '0', the mobile station shall select a system other than the system from which it was redirected in accordance with the custom system selection process (see 6.6.1.1.1), and shall attempt to acquire the selected system (see 6.6.1.1.4). The precise process for determining how to avoid the system from which the mobile station was redirected is left to the mobile station manufacturer.

If REDIRECTION$_s$ is equal to disabled, the mobile station shall select a system in accordance with the custom system selection process (see 6.6.1.1.1), and shall attempt to acquire the selected system (see 6.6.1.1.4).

If the mobile station enters the System Determination Substate with a wrong network indication, the mobile station shall perform the following:

If REDIRECTION$_s$ is equal to enabled, the mobile station shall attempt to select another system in accordance with the current redirection criteria (see 6.6.1.1.2). If the mobile station is able to select another system, the mobile station shall attempt to acquire the selected system (see 6.6.1.1.4). Otherwise, if the mobile station has exhausted all possible selections using the current redirection criteria, the mobile station shall perform the following:

The mobile station shall set REDIRECTION$_s$ to disabled.

The mobile station shall set RETURN_CAUSE$_s$ to '0101'.

If RETURN_IF_FAIL$_s$ is equal to '1', the mobile station shall attempt to select the system from which it was redirected, and shall attempt to acquire the selected system (see 6.6.1.1.4). The precise process for determining how to select the system from which the mobile station was redirected is left to the mobile station manufacturer.

If RETURN_IF_FAIL$_s$ is equal to '0', the mobile station shall select a system other than the system from which it was redirected in accordance with the custom system selection process (see 6.6.1.1.1), and shall attempt to acquire the selected system (see 6.6.1.1.4). The precise process for determining how to avoid the system from which the mobile station was redirected is left to the mobile station manufacturer.

If REDIRECTION$_s$ is equal to disabled, the mobile station shall select a system in accordance with the custom system selection process (see 6.6.1.1.1), and shall attempt to acquire the selected system (see 6.6.1.1.4).

6.6.1.1.1 Custom System Selection Process
[ ... ]
6.6.1.1.2 System Selection Using Current Redirection Criteria
[ ... ]
6.6.1.1.3 System Selection Using System Reselection Criteria The precise process for selecting a system using system reselection criteria is left to the mobile station manufacturer. The mobile station should use information received in the Neighbor List Message, Extended Neighbor List Message, or General Neighbor List Message to perform the system reselection process as follows:

If there are pilots in the Neighbor List on a different frequency assignment than that of the mobile station, the mobile station may select the CDMA system consisting of these neighbor pilots. If the mobile station is to use a CDMA system, it shall set $CDMABAND_s$ to the band class (see TSB58) for the selected system and shall set $CDMACH_s$ to the CDMA Channel number (see 6.1.1.1.2) for the selected system.

If $NUM\_ANALOG\_NGHBR_s$ is not equal to '000', the mobile station may select an analog system as specified by ANALOG_NGHBR_LIST. If the mobile station is to use System A of the 800 MHz analog system, it shall set $SERVSYS_s$ to SYS_A. If the mobile station is to use System B of the 800 MHz analog system, it shall set $SERVSYS_s$ to SYS_B.

[ . . . ]

6.6.1.1.4 Acquiring the Selected System

The mobile station shall attempt to acquire the selected system as follows:

[ . . . ]

6.6.2 Mobile Station Idle State

In this state, the mobile station monitors the Paging Channel. The mobile station can receive messages, receive an incoming call (mobile station terminated call), initiate a call (mobile station originated call), cancel a PACA call, initiate a registration, or initiate a message transmission.

[ . . . ]

While in the Mobile Station Idle State, the mobile station shall perform the following procedures:

[ . . . ]

The mobile station shall perform idle handoff procedures as specified in 6.6.2.1.4.

The mobile station shall perform system reselection procedures as specified in 6.6.2.1.6.

[ . . . ]

6.6.2.1.6 System Reselection Procedures

The mobile station shall enter the System Determination Substate of the Mobile Station Initialization State with a system reselection indication (see 6.6.1.1) if the following are true:

$RESELECT\_INCLUDED_s$ is equal to '1';

The following inequality is satisfied:

$$-20*\log_{10}(Ec/Io) < EC\_IO\_THRESH_s$$

where Ec/Io is the measured Ec/Io of the active pilot; and

The following inequality is satisfied:

$$pilot\_power < EC\_THRESH_s - 115$$

where pilot_power (dBm/1.23 MHz)=$-20\log_{10}$ (Ec/Io) (dB)+mean input power (dBm/1.23 Mhz) and Ec/Io is the measured Ec/Io of the active pilot.

6.6.2.2 Response to Overhead Information Operation

[ . . . ]

6.6.2.2.1.1 Stored Parameters

[ . . . ]

If $EXT\_SYS\_PARAMETER_s$ is equal to '0', then the mobile station shall perform the following:

Set $EXT\_SYS\_PAR\_MSG\_SEQ_s$ to $CONFIG\_MSG\_SEQ_s$,

Set $BCAST\_INDEX_s$ to $MAX\_SLOT\_CYCLE\_INDEX_s$,

Set IMSI_O to IMSI_M by setting $IMSI\_O\_S_s$ to $IMSI\_M\_S_p$ (i.e. setting $IMSI\_O\_S1_s$ to $IMSI\_M\_S1_p$ and $IMSI\_O\_S2_s$ to $IMSI\_M\_S2_p$), $MCC\_O_s$ to $MCC\_M_p$, $IMSI\_O\_11\_12_s$ to $IMSI\_M\_11\_12_p$, and $IMSI\_O\_ADDR\_NUM_s$ to $IMSI\_M\_ADDR\_NUM_p$, Set $RESELECT\_INCLUDED_s$ to '0', Set $P\_REV_s$ to '00000011' for Band Class 0 or $P\_REV_s$ to '00000001' for Band Class 1, and Set $P\_REV\_IN\_USE_s$ to the lesser value of $P\_REV_s$ and $MOB\ P\_REV_p$.

[ . . . ]

6.6.2.2.3 Neighbor List Message

[ . . . ]

The mobile station shall set the ACCESS HO ALLOWED field of the IDLE HANDOFF REC[i] to '0' for all NGHBR SET $SIZE_s$ entries if any of the following conditions are met:

EXT SYS $PARAMETER_s$ is equal to '0',

NGHBR SET ACCESS $INFO_s$ is equal to '0', or

EXT SYS PAR MSG $SEQ_s$ is not equal to CONFIG MSG $SEQ_s$.

The mobile station shall set $NUM\_ANALOG\_NGHBR_s$ to '000' and ANALOG_NGHBR_LIST to NULL.

[ . . . ]

6.6.2.2.5 Extended System Parameters Message

[ . . . ]

If the protocol revision level supported by mobile station ($MOB\ P\ REV_p$) is less than the minimum protocol revision level supported by the base station ($MIN\ P\ REV_r$), the mobile station shall enter the System Determination Substate of the Mobile Station Initialization State with a protocol mismatch indication (see 6.6.1.1). Otherwise, the mobile station shall store the following parameters:

[ . . . ]

TMSI zone number ($TMSI\ ZONE_s = TMSI\ ZONE_r$)

System reselection indicator ($RESELECT\_INCLUDED_s = RESELECT\ INCLUDED_r$) if included in the message; otherwise, $RESELECT\_INCLUDED_s = '0'$.

[ . . . ]

If the mobile station supports packet data service options, the mobile station shall store the packet data services zone identifier ($PACKET\ ZONE\ ID_s = PACKET\ ZONE\ ID_r$).

If $RESELECT\_INCLUDED_s$ is equal to '1', the mobile station shall store:

Pilot power threshold ($EC\_THRESH_s = EC\_THRESH_r$)

Pilot $E_c/I_0$ threshold ($EC\_IO\_THRESH_s = EC\_IO\_THRESH_r$)

[ . . . ]

6.6.2.2.7 Extended Neighbor List Message

[ . . . ]

The mobile station shall set the ACCESS HO ALLOWED field of the IDLE HANDOFF REC[i] to '0' for all NGHBR SET $SIZE_s$ entries if any of the following conditions are met:

EXT SYS $PARAMETER_s$ is equal to '0',

NGHBR SET ACCESS $INFO_s$ is equal to '0', or

EXT SYS PAR MSG $SEQ_s$ is not equal to CONFIG MSG $SEQ_s$.

The mobile station shall set $NUM\_ANALOG\_NGHBR_s$ to '000' and ANALOG_NGHBR_LIST to NULL.

[ . . . ]

6.6.2.2.8 General Neighbor List Message

[ . . . ]

The mobile station shall update the idle handoff Neighbor Set (see 6.6.2.1.4) so that it consists only of pilot offsets listed in the General Neighbor List Message. If the General Neighbor List Message contains more pilot offsets than the mobile station can store, the mobile station shall store the pilot offsets beginning at the start of the General Neighbor List Message, up to the limits of the mobile station's Neighbor Set storage capacity.

The mobile station shall set NUM_ANALOG_NGHBR$_s$ to NUM_ANALOG_NGHBR$_r$, the number of neighboring analog systems contained in the General Neighbor List Message. For each of the neighboring analog systems contained in the General Neighbor List Message, the mobile station shall perform the following:

Set the BAND_CLASS field of ANALOG_NGHBR_LIST[i] to the ith occurrence of BAND_CLASS$_r$.

Set the SYS_A_B field of ANALOG_NGHBR_LIST[i] to the ith occurrence of SYS_A_B$_r$.

[ . . . ]

7.6.6.2.1.2 Neighbor List

The base station sends a Neighbor List on the Paging Channel in the Neighbor List Message, the Extended Neighbor List Message, or the General Neighbor List Message.

[ . . . ]

The base station may also indicate the availability of neighboring analog systems in the General Neighbor List Message to assist the mobile station in performing system reselection (see 6.6.2.1.6).

7.6.6.2.1.3 Candidate Frequency Neighbor List

[ . . . ]

7.7.2.3.2.13 Extended System Parameters Message

When the base station sends an Extended System Parameters Message, it shall use the following variable-length message format:

| Field | Length (bits) |
|---|---|
| MSG_TYPE ('00001101') | 8 |
| PILOT_PN | 9 |
| CONFIG_MSG_SEQ | 6 |
| DELETE FOR TMSI | 1 |
| USE TMSI | 1 |
| PREF_MSID_TYPE | 2 |
| MCC | 10 |
| IMSI_11_12 | 7 |
| TMSI ZONE LEN | 4 |
| TMSI ZONE | 8 TMSI ZONE LEN |
| BCAST_INDEX | 3 |
| IMSI T SUPPORTED | 1 |
| P REV | 8 |
| MIN P REV | 8 |
| SOFT SLOPE | 6 |
| ADD INTERCEPT | 6 |
| DROP INTERCEPT | 6 |
| PACKET ZONE ID | 8 |
| RESELECT INCLUDED | 1 |
| EC THRESH | 0 or 5 |
| EC I0 THRESH | 0 or 5 |
| PILOT REPORT | 1 |
| NGHBR SET ENTRY INFO | 1 |
| MSG ENTRY HO | 0 or 1 |
| NGHBR SET ACCESS INFO | 1 |
| ACCESS HO | 0 or 1 |
| ACCESS HO MSG RSP | 0 or 1 |
| ACCESS PROBE HO | 0 or 1 |
| ACC PROBE HO OTHER MSG | 0 or 1 |
| MAX NUM PROBE HO | 0 or 3 |
| NGHBR SET SIZE | 0 or 5 |
| If NGHBR SET ENTRY INFO = 1, NGHBR SET SIZE occurrences of the following field; otherwise, no occurrence of the following field: | |
| ACCESS ENTRY HO | 1 |
| If NGHBR SET ACCESS INFO = 1, NGHBR SET SIZE occurrences of the following field; otherwise, no occurrence of the following field: | |
| ACCESS HO ALLOWED | 1 |
| RESERVED | 0-7 (as needed) |

[ . . . ]

PACKET ZONE ID

Packet data services zone identifier.

If the base station supports a packet data service zone, the base station shall set this field to its non-zero packet data services zone identifier.

If the base station does not support a packet data service zone, the base station shall set this field to '00000000'.

RESELECT_INCLUDED

System reselection parameters included.

If the base station is including system reselection parameters, the base station shall set this field to '1'; otherwise, the base station shall set this field to '0'.

EC_THRESH

Pilot power threshold.

If RESELECT_INCLUDED is set to '1', the base station shall include the field EC THRESH and set this field to:

$$\lfloor (pilot\_power\_threshold+115) \rfloor$$

where pilot_power_threshold is the pilot power, $E_c$, in dBm/1.23 MHz, below which the mobile station is to perform system reselection; otherwise, the base station shall omit this field.

EC_IO_THRESH

Pilot $E_c/I_0$ threshold.

If RESELECT_INCLUDED is set to '1', the base station shall include the field EC_IO_THRESH and set this field to:

$$\lfloor -20 \log_{10} (pilot\ threshold) \rfloor$$

where pilot threshold is the pilot $E_c/I_0$ below which the mobile station is to perform system reselection; otherwise, the base station shall omit this field.

[ . . . ]

7.7.2.3.2.22 General Neighbor List Message

When the base station sends a General Neighbor List Message, it shall use the following variable-length message format:

| Field | Length (bits) |
|---|---|
| MSG TYPE ('00010110') | 8 |
| PILOT PN | 9 |
| CONFIG MSG SEQ | 6 |
| PILOT INC | 4 |
| NGHBR SRCH MODE | 3 |
| NUM NGHBR | 5 |
| NUM NGHBR occurrences of the following record: | |
| NGHBR CONFIG | 3 |
| NGHBR PN | 9 |
| SEARCH PRIORITY | 0 or 2 |
| SRCH WIN NGHBR | 0 or 4 |
| FREQ INCL | 1 |

-continued

| Field | Length (bits) |
|---|---|
| NGHBR BAND | 0 or 5 |
| NGHBR FREQ | 0 or 11 |
| NUM ANALOG NGHBR | 3 |
| NUM ANALOG NGHBR occurrences of the following record: | |
| BAND CLASS | 5 |
| SYS A B | 2 |
| RESERVED | 0–7 (as needed) |

[ ... ]
NUM_ANALOG_NGHBR
Number of neighboring analog systems.
The base station shall set this field to the number of neighboring analog systems included in the message.
The base station shall include one occurrence of the following record for each neighboring base station included in the message.
BAND_CLASS
Band class.
The base station shall set this field to the CDMA band class, as specified in TSB58.
SYS_A_B
System A/B.
If BAND_CLASS is set to '00000', the base station shall set this field to the value shown in Table 7.7.2.3.2.22-2 corresponding to the availability of neighboring analog systems; otherwise, the base station shall set this field to '00'.

Table 7.7.2.3.2.22-2

| Cellular System A/B | |
|---|---|
| CellularSystemA/B | Value |
| RESERVED | 00 |
| System A | 01 |
| System B | 10 |
| System A and B | 11 |

RESERVED
Reserved bits.
The base station shall add reserved bits as needed in order to make the length of the entire message equal to an integer number of octets. The base station shall set these bits to '0'.
[ ... ]
The invention disclosed herein is susceptible to various modifications and alternative forms. Specific embodiments therefor have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

What is claimed is:

1. A method for operating a cellular wireless communication system that includes a border cell base station and services a mobile station, the method comprising:

determining idle system reselection signal strength thresholds including a signal strength to interference threshold and a signal strength threshold, wherein the signal strength to interference threshold and the signal strength threshold are for use by the mobile station when idle in initiating system reselection that results in registration with a differing cellular wireless communication system; and transmitting the signal strength to interference threshold and the signal strength threshold from the border cell base station to the mobile station.

2. The method of claim 1, wherein the cellular wireless communication system operates according to a Code Division Multiple Access standard.

3. The method of claim 1, further comprising:

determining neighboring system information for the border cell, wherein the neighboring system information indicates at least one neighboring cellular wireless communication system that the mobile station may select during system reselection; and transmitting the neighboring system information to the mobile station.

4. The method of claim 3, wherein:

the cellular wireless communication system operates according to the Code Division Multiple Access standard; and the neighboring system information includes information regarding a neighboring cellular wireless communication system that operates according to an analog standard.

5. The method of claim 3, wherein:

the cellular wireless communication system operates according to the Code Division Multiple Access standard; and the neighboring system information includes information regarding a neighboring cellular wireless communication system that operates according to the Code Division Multiple Access standard.

6. The method of claim 1, further comprising:

determining neighboring system information for the border cell, wherein the neighboring system information indicates at least one overlay cellular wireless communication system that the mobile station may select during system reselection; and transmitting the neighboring system information to the mobile station.

7. The method of claim 6, wherein:

the cellular wireless communication system operates according to the Code Division Multiple Access standard; and the neighboring system information includes information regarding an overlay cellular wireless communication system that operates according to an analog standard.

8. The method of claim 6, wherein:

the cellular wireless communication system operates according to the Code Division Multiple Access standard; and the neighboring system information includes information regarding an overlay cellular wireless communication system that operates according to the Code Division Multiple Access standard.

9. The method of claim 1, wherein the signal strength to interference threshold and the signal strength threshold are transmitted from the border cell base station to the mobile station in an Extended System Parameters Message.

10. A method for operating a mobile station within a cellular wireless communication system to determine when system reselection is required when the mobile station is idle, the method comprising:

receiving a carrier signal from a base station of the cellular wireless communication system;

determining an energy of the carrier signal;

determining interference energy;

determining a ratio of the energy of the carrier signal to the interference energy;

receiving both a signal strength threshold and a signal strength to interference threshold from the base station;

comparing the energy of the carrier signal to the signal strength threshold;

comparing the ratio of the energy of the carrier signal to an interference energy to the signal strength to interference threshold; and when the mobile station is idle, the energy of the carrier signal compares unfavorably to the signal strength threshold, and the ratio of the energy of the carrier signal to an interference energy compares unfavorably to the signal strength to interference threshold, initiating system reselection that results in registration with a differing cellular wireless communication system.

11. The method of claim 10, wherein the cellular wireless communication system operates according to a Code Division Multiple Access standard.

12. The method of claim 10, further comprising:

receiving neighboring system information for the border cell from the base station, wherein the neighboring system information indicates at least one neighboring cellular wireless communication system that the mobile station may select during system reselection; and upon system reselection, using the neighboring system information to select a neighboring system for subsequent operation.

13. The method of claim 12, wherein:

the cellular wireless communication system operates according to the Code Division Multiple Access standard; and the neighboring system information includes information regarding a neighboring cellular wireless communication system that operates according to an analog standard.

14. The method of claim 12, wherein:

the cellular wireless communication system operates according to the Code Division Multiple Access standard; and the neighboring system information includes information regarding a neighboring cellular wireless communication system that operates according to the Code Division Multiple Access standard.

15. The method of claim 12, further comprising:

receiving neighboring system information for the border cell from the base station, wherein the neigboring system information indicates at least one overlay cellular wireless communication system that the mobile station may select during system reselection; and upon system reselection, using the neighboring system information to select an overlay cellular wireless communication system for subsequent operation.

16. The method of claim 15, wherein:

the cellular wireless communication system operates according to the Code Division Multiple Access standard; and the neighboring system information includes information regarding an overlay cellular wireless communication system that operates according to an analog standard.

17. The method of claim 15, wherein:

the cellular wireless communication system operates according to the Code Division Multiple Access standard; and the neighboring system information includes information regarding an overlay cellular wireless communication system that operates according to the Code Division Multiple Access standard.

18. The method of claim 10, wherein the signal strength to interference threshold and the signal strength threshold are received from the border cell base station by the mobile station in a System Parameters message.

19. A base station that supports wireless communications within a border cell with a mobile station, the base station comprising:

an antenna;

a radio frequency transceiver;

CDMA spreading/despreading circuitry;

processing circuitry; and memory in which idle system reselection signal strength thresholds are stored, the idle system reselection signal strength thresholds including a signal strength to interference threshold and a signal strength threshold, wherein the signal strength to interference threshold and the signal strength threshold are for use by the mobile station when idle in initiating system reselection that results in registration with a differing cellular wireless communication system.

20. The base station of claim 19, further comprising an interface that couples the base station to a base station controller.

21. The base station of claim 19, wherein:

the memory further stores neighboring system information for the border cell, wherein the neighboring system information indicates at least one neighboring cellular wireless communication system that the mobile station may select during system reselection; and the base station transmits the neighboring system information to the mobile station.

22. The base station of claim 21, wherein the neighboring system information includes information regarding a neighboring cellular wireless communication system that operates according to an analog standard.

23. The base station of claim 21, wherein the neighboring system information includes information regarding a neighboring cellular wireless communication system that operates according to the Code Division Multiple Access standard.

24. The base station of claim 21, wherein:

the neighboring system information indicates at least one overlay cellular wireless communication system that the mobile station may select during system reselection; and the base station transmits the neighboring system information to the mobile station.

25. The base station of claim 24, wherein the neighboring system information includes information regarding an overlay cellular wireless communication system that operates according to an analog standard.

26. The base station of claim 24, wherein the neighboring system information includes information regarding an overlay cellular wireless communication system that operates according to the Code Division Multiple Access standard.

27. A mobile station for operating in a Code Division Multiple Access wireless communication system having at least one border cell base station, the mobile station comprising:

an antenna;

a tunable radio frequency transceiver;

CDMA spreading/despreading circuitry;

processing circuitry; and memory in which idle system reselection signal strength thresholds that have been received from the border cell base station are stored, the idle system reselection signal strength thresholds including a signal strength to interference threshold and a signal strength threshold, wherein the mobile station employs the signal strength to interference threshold and the signal strength threshold in initiating system reselection and registration with a neighboring cellular wireless communication system when the mobile station is idle.

28. The mobile station of claim 27, further comprising a user interface.

29. The mobile station of claim 27, wherein:

the memory further stores neighboring system information for the border cell, wherein the neighboring system information indicates at least one neighboring cellular wireless communication system that the mobile station may select during system reselection; and the mobile station receives the neighboring system information from the border cell base station.

30. The mobile station of claim 29, wherein the neighboring system information includes information regarding a neighboring cellular wireless communication system that operates according to an analog standard.

31. The mobile station of claim 29, wherein the neighboring system information includes information regarding a neighboring system that operates according to the Code Division Multiple Access standard.

32. The mobile station of claim 27, wherein:

the memory further stores neighboring system information for the border cell, wherein the neighboring system information indicates at least one overlay cellular wireless communication system that the mobile station may select during system reselection; and the mobile station receives the neighboring system information from the border cell base station.

33. The mobile station of claim 32, wherein the neighboring system information includes information regarding an overlay cellular wireless communication system that operates according to an analog standard.

34. The mobile station of claim 32, wherein the neighboring system information includes information regarding an overlay system that operates according to the Code Division Multiple Access standard.

* * * * *